(12) United States Patent
Jan (10) Patent No.: US 10,124,536 B1
(45) Date of Patent: Nov. 13, 2018

(54) EDGE BANDING MACHINE

(71) Applicant: OAV EQUIPMENT & TOOLS, INC., Taichung (TW)

(72) Inventor: Long-Chang Jan, Taichung (TW)

(73) Assignee: Oav Equipment & Tools, Inc., Taichung (TW)

( * ) Notice: Subject to any disclaimer, the term of this patent is extended or adjusted under 35 U.S.C. 154(b) by 0 days.

(21) Appl. No.: 15/864,487

(22) Filed: Jan. 8, 2018

(51) Int. Cl.
| B29C 65/52 | (2006.01) |
| B29C 65/00 | (2006.01) |
| B29C 65/78 | (2006.01) |

(52) U.S. Cl.
CPC ............ B29C 65/524 (2013.01); B29C 65/78 (2013.01); B29C 66/80 (2013.01)

(58) Field of Classification Search
USPC ........................................ 156/538, 547, 578
See application file for complete search history.

(56) References Cited

U.S. PATENT DOCUMENTS

| 4,394,408 A * | 7/1983 | Walter .................... B05C 3/20 |
| | | 118/102 |
| 5,112,439 A * | 5/1992 | Reisman ................. C23C 16/04 |
| | | 117/102 |
| 6,467,522 B1 * | 10/2002 | Durney .................. B26D 1/205 |
| | | 156/355 |
| 2012/0058279 A1 * | 3/2012 | Schmid .................. B27D 5/003 |
| | | 427/536 |
| 2016/0107281 A1 * | 4/2016 | Rathgeber ............... B23Q 7/03 |
| | | 198/345.1 |
| 2018/0022489 A1 * | 1/2018 | Tanner ................... B65B 13/04 |
| | | 53/399 |

* cited by examiner

*Primary Examiner* — Sing P Chan (74) *Attorney, Agent, or Firm* — Muncy, Geissler, Olds & Lowe, P.C.

(57) ABSTRACT

An edge banding machine having a platform, a glue applicator and, an edge band transmission mechanism for affixing an edge band to a workpiece is disclosed. The glue applicator is mounted at the platform, including a glue-applying shaft. The edge band transmission mechanism is mounted at the platform adjacent to the glue applicator, including an edge band transferring shaft disposed in parallel to the glue-applying shaft and a motor connected with the edge band transferring shaft for driving the edge band transferring shaft to rotate. The edge band transferring shaft is connected with the glue-applying shaft so that the edge band transferring shaft and the glue-applying shaft can be synchronously rotated.

10 Claims, 9 Drawing Sheets

EDGE BANDING MACHINE

BACKGROUND OF THE INVENTION

1. Field of the Invention

The present invention relates to edge banding machine, and more particularly to an improved structure of edge banding machine, which can effectively reduce problem of machining error during processing.

2. Description of the Related Art

Figure 1:
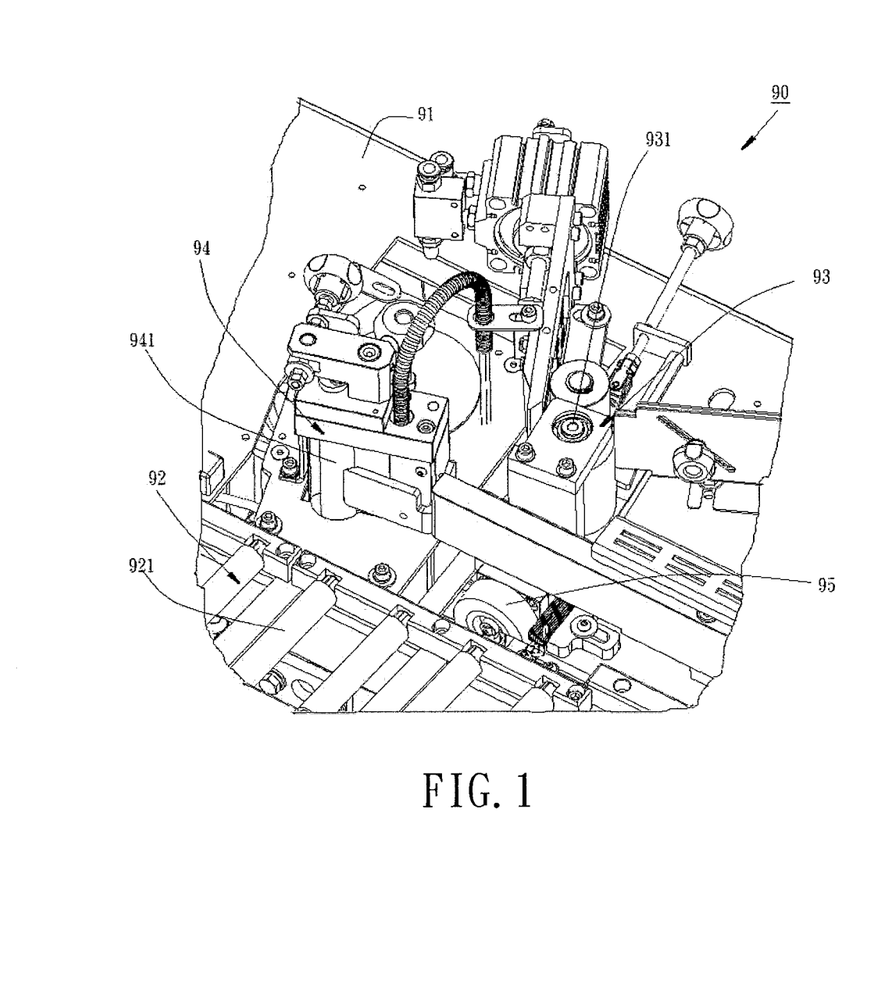
FIG. 1 is an oblique top elevational view of a conventional edge banding machine.

FIG. 1 illustrates a conventional edge banding machine. The edge banding machine 90 comprises a platform 91, a feeding mechanism 92, an edge band transmission mechanism 93 and a glue applicator 94. The feeding mechanism 92 comprises a feeding roller set 921 for feeding a workpiece to be processed forward, enabling the workpiece to be delivered to the edge band transmission mechanism 93 and the glue applicator 94 at the platform 91. When the workpiece is moved to the glue applicator 94, one side of the workpiece is disposed with a layer of hot melt glue for the bonding of an edge band of a predetermined length. The predetermined length of the edge band is determined according to the side length of the workpiece. In order to enable the edge banding machine to get the data of this predetermined length, the edge banding machine 90, in design, uses a workpiece driven roller 95. When the workpiece is move to the workpiece driven roller 95, the workpiece drives the workpiece driven roller to rotate, and the predetermined length is measured according to the angle of rotation of the workpiece driven roller 95.

However, the glue-applying shaft 941 of the glue applicator 94 of the edge banding machine 90 and the edge band transferring shaft 931 of the edge band transmission mechanism 93 are respectively driven by a respective motor. After a long use of the edge banding machine 90, the workpiece driven roller 95 may wear. When the workpiece driven roller 95 wears, the radius of the workpiece driven roller 95 is relatively reduced, at this time, the predetermined length thus measured is inaccurate, resulting in a speed difference between the motor of the glue applicator 94 and the motor of the edge band transmission mechanism 93 and further machining error in processing. Further, the surface smoothness of the workpiece to be processed may also lead to measurement inaccuracy. Therefore, the conventional edge banding machine 90 still has room for improvement.

In order to solve the aforesaid problems, the technical staff of the manufacturer of the edge banding machine 90 needs to tune the edge banding machine 90 after a certain period of use, so that the problem of measurement inaccuracy will not become more serious. However, the speed tuning work will not only affect the production operation of the edge banding machine 90, but will also cause additional expenditure in time and money.

SUMMARY OF THE INVENTION

The present invention has been accomplished under the circumstances in view. It is one object of the present invention to provide an edge banding machine, which avoids the problem of inconsistent speed between the edge band transferring shaft and glue-applying shaft of the edge band transmission mechanism after a long time operation of the edge banding machine.

It is another object of the present invention to provide an edge banding machine, which effectively reduces machining error and saves the material consumption of the edge band.

To achieve these and other objects of the present invention, an edge banding machine is used for affixing an edge band to a workpiece, comprising a platform, a glue applicator, and an edge band transmission mechanism. The glue applicator is mounted at the platform, comprising a glue-applying shaft. The edge band transmission mechanism is mounted at the platform adjacent to the glue applicator. The edge band transmission mechanism comprises an edge band transferring shaft and a motor. The edge band transferring shaft is disposed in parallel to the glue-applying shaft, and coupled to the glue-applying shaft by a chain so that the edge band transferring shaft and the glue-applying shaft can be synchronously rotatable. The motor is connected with the edge band transferring shaft or the glue-applying shaft so that the motor can rotate the edge band transferring shaft.

One beneficiary effect of the present invention is that: using the chain to couple the edge band transferring shaft and the glue-applying shaft enables the edge band transferring shaft and the glue-applying shaft to be synchronously rotated as the motor drives the edge band transferring shaft to rotate, thus the speed of the edge band transferring shaft and the speed of glue-applying shaft can be maintained consistent after a long time operation of the edge banding machine, eliminating the problem that the technical staff needs to spend extra time and money to tune the speed; further, the edge banding machine of the present invention uses one single motor to rotate the edge band transferring shaft and the glue-applying shaft, integrating the power source of each mechanism to improve the processing quality of the edge banding machine. Further, the invention simplifies the overall structural design, making the edge banding machine lighter and reducing the width of the edge banding machine to the range within 2 meters, and thus, the invention reduces the space occupancy in the plant and the overall cost of edge banding machine and improves space utilization.

The invention also provides an alternate form of edge banding machine for affixing an edge band to a workpiece, comprising a platform, a feeding mechanism, a glue applicator, a sensor, an edge band transmission mechanism, a cutting tool and a control unit. The feeding mechanism is mounted at the platform and adapted for feeding the workpiece. The glue applicator is mounted at the platform, comprising a glue-applying shaft. The sensor is mounted at the platform, and adapted for detecting the presence of the workpiece and generating a corresponding sensing signal. The edge band transmission mechanism is mounted at the platform adjacent to the glue applicator, comprising an edge band transferring shaft disposed in parallel to the glue-applying shaft to transfer the edge band. The edge band transferring shaft is connected with the glue-applying shaft by a chain, so that the edge band transferring shaft and the glue-applying shaft can be synchronously rotated, and a motor connected with the edge band transferring shaft for synchronously driving the edge band transferring shaft and the glue-applying shaft to rotate. The cutting tool is movably mounted at the platform adjacent to the edge band transmission mechanism. The control unit is adapted for receiving the sensing signal, and controlling the motor to drive the cutting tool to cut off the edge band according to the received sensing signal.

Another beneficiary effect of the present invention is that: through the sensor to detect the position of the workpiece, the control unit can control the rotation of the motor and the movement of the cutting tool according to the length of the workpiece in advance, accurately controlling the length of the edge band, reducing machining error and saving the material consumption of the edge band.

In one aspect, the edge band transmission mechanism further comprises a transmission shaft disposed in parallel to the edge band transferring shaft. The edge band transferring shaft is mounted with a first gear. The transmission shaft is mounted with a second gear which is meshed with the first gear. The edge band transferring shaft is coupled to the glue-applying shaft through the transmission shaft and the chain.

Preferably, the transmission shaft is mounted with a third gear. The glue-applying shaft is mounted with a fourth gear. The chain is coupled between the third gear and the fourth gear.

Preferably, the motor comprises a power output shaft coaxially connected to the transmission shaft for driving the edge band transferring shaft to rotate.

In another aspect, the edge band transmission mechanism further comprises a rack, an edge band transferring roller and a movable pinch roller. The edge band transferring shaft is mounted in the rack and connected to the edge band transferring roller. The edge band transferring roller has at least a part thereof exposed to the outside of the rack, and is adapted for transferring the edge band forward. The movable pinch roller is movably between a proximal position in proximity to the edge band transferring roller and a remote position remote from the edge transferring roller; the edge banding machine further has a control unit and a sensor. The sensor is adapted for detecting the position of the workpiece and generating a corresponding sensing signal. The control unit controls the movable pinch roller to move according to the received sensing signal.

Other advantages and features of the present invention will be fully understood by reference to the following specification in conjunction with the accompanying drawings, in which like reference signs denote like components of structure.

DETAILED DESCRIPTION OF THE INVENTION

In order to provide a detailed description of the technical features of the present invention, the following preferred embodiment is given by way of example with reference to the accompanying drawings, in which the feeding mechanism 20 is provided on the front side of the platform 10 as a direction reference.

Figure 2:
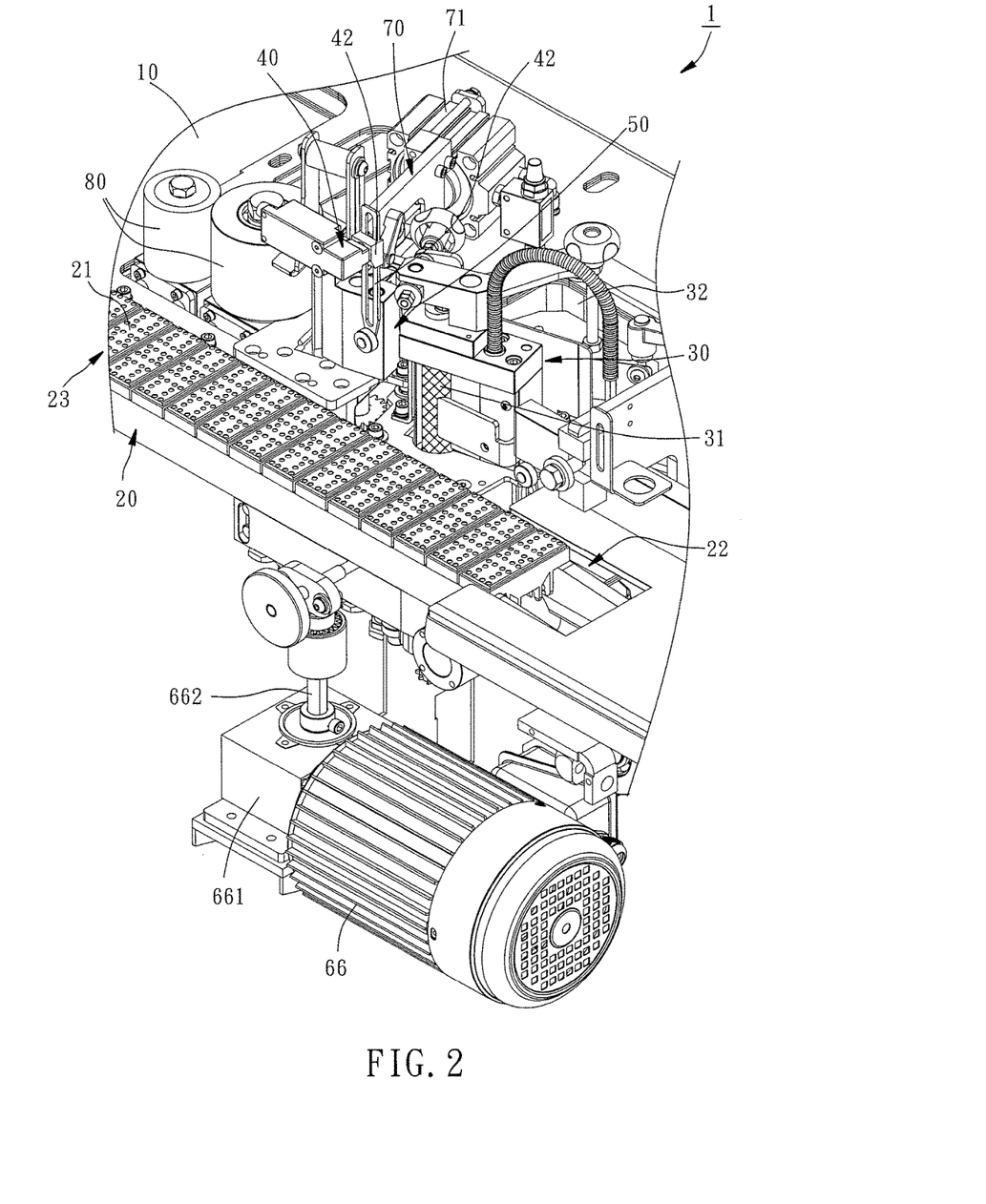
FIG. 2 is an oblique top elevational view of an edge banding machine in accordance with an embodiment of the present invention.

Referring to FIG. 2, the edge banding machine, referenced by 1, generally comprises a platform 10, a feeding mechanism 20, a glue applicator 30, a sensor 40, an edge band transmission mechanism 50, a cutting tool 70 and a control unit 85. The feeding mechanism 20 is disposed at one side of the platform 10, comprising a conveyor belt 21 driven by a motor (not shown) to deliver a workpiece S to be processed from a feed end 22 to a discharge end 23. Further, a positioning roller (not shown) is disposed above the conveyor belt 21 with a distance defined therebetween. This distance is equal to the height of the workpiece S so that the workpiece S to be processed can be steadily positioned between the positioning roller and the conveyor belt 21 and positively delivered by the conveyor belt 21.

Figure 3:
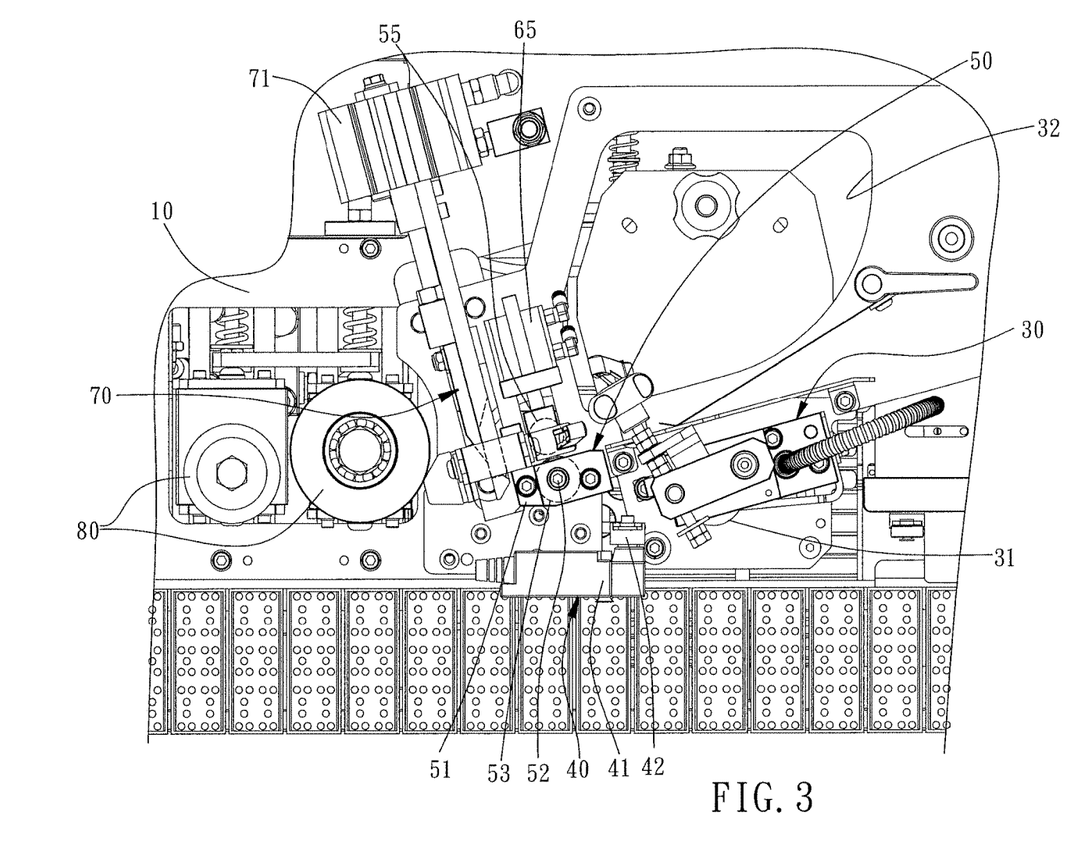
FIG. 3 is a top view of the edge banding machine in accordance with the present embodiment of the present invention.
Figure 4:
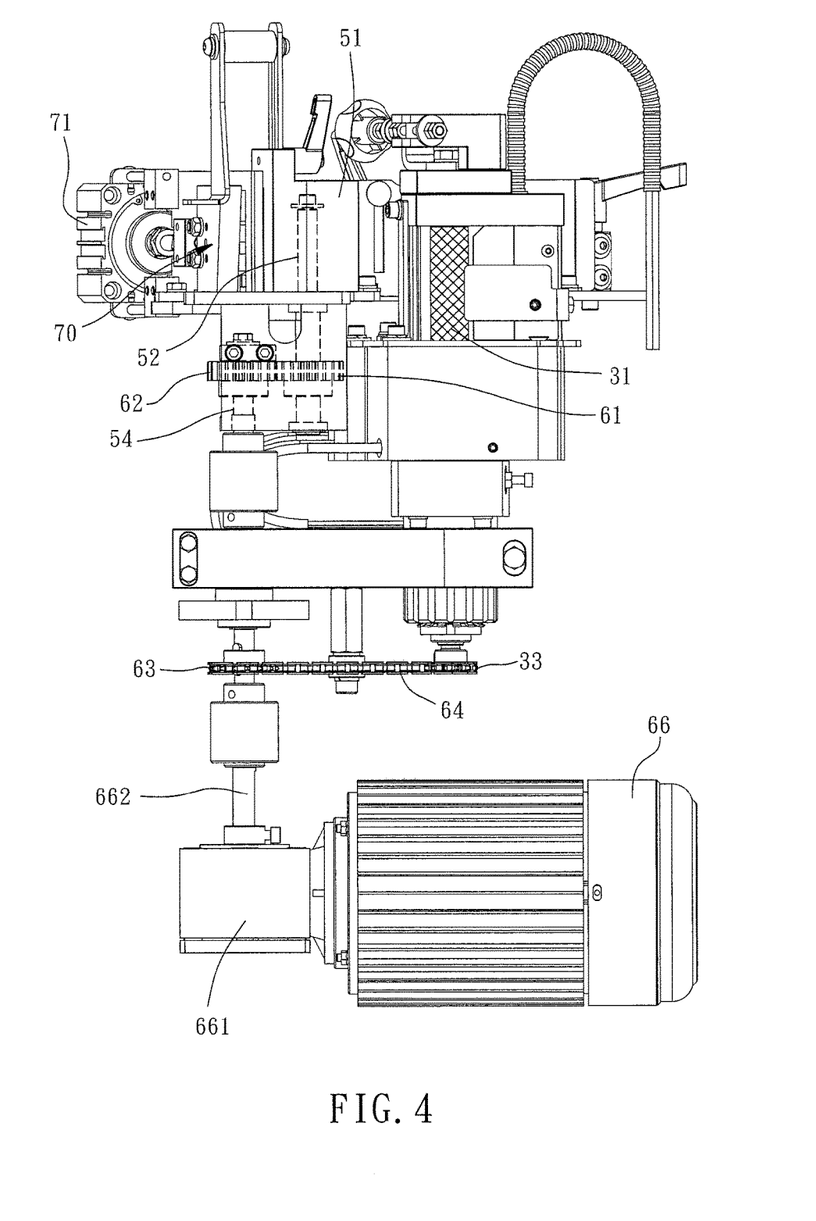
FIG. 4 is a side view of the edge banding machine in accordance with the present embodiment of the present invention.

Referring to FIGS. 3 and 4, the glue applicator 30 is mounted on the platform 10, comprising a glue-applying shaft 31 and a glue trough 32. The glue-applying shaft is mounted with a fourth gear 33 connected to a bottom end of the glue-applying shaft 31. The glue trough 32 has stored therein glue. When the glue is being heated and melted, the hot melt glue is sucked up and guided to the surface of the glue-applying shaft 31 upon the rotation of the glue-applying shaft, so that when the workpiece S is moved to the glue-applying shaft 31, the hot melt glue is applied to one side surface P of the workpiece S (see FIG. 5c).

Referring to FIGS. 2-4, the sensor 40 is mounted on the platform 10 by a bracket 41, comprising a rotating shaft 42 rotatable relative to the bracket 41. When the workpiece S is moved to the sensor 40, the workpiece S pushes the rotating shaft 42 to rotate, at this time, the sensor 40 converts the rotation of the rotating shaft 42 into a sensing signal.

The edge band transmission mechanism 50 is mounted on the platform 10 at a left side relative to the glue applicator 30. The edge band transmission mechanism 50 comprises a rack 51, an edge band transferring shaft 52, an edge band transferring roller 53, a transmission shaft 54 and a movable pinch roller 55. The edge band transferring shaft 52 is rotatably mounted in the rack 51, and the edge band transferring roller 53 is attached onto the edge band transferring shaft 52. The edge band transferring shaft 52 and the glue-applying shaft 31 are arranged in parallel (see FIG. 4). The edge band transferring shaft 52 has a bottom end thereof mounted with a first gear 61. The transmission shaft 54 and the edge band transferring shaft 52 are arranged in parallel. The transmission shaft 54 has a top end thereof mounted with a second gear 62, and an opposing bottom end thereof mounted with a third gear 63. The second gear 62 is meshed with the first gear 61. Further, a chain 64 is coupled between the third gear 63 and the fourth gear 33 of the glue-applying shaft 31 so that the edge band transferring shaft 52 is coupled to the glue-applying shaft 31 through the transmission shaft 54 and the chain 64.

The edge band transferring roller 53 has at least a part thereof exposed to the outside of the rack 51. The movable pinch roller 55 can be driven by a first pneumatic cylinder 65 to move between a proximal position in proximity to the edge band transferring roller 53 and a remote position remote from the edge band transferring roller 53. When the movable pinch roller 55 is moved to the proximal position, the movable pressure wheel 55 pushes the edge band B into contact with the edge band transferring roller 53, allowing the edge band transferring roller 53 to transfer the edge band B forward in the leftward direction; when the movable pinch roller 55 is moved to the remote position, the movable pinch roller 55 is released from the edge band B, the edge band B is kept away from the edge band transferring roller 53, and thus, the edge band transferring roller 53 cannot transfer the edge band B forward.

Further, as illustrated in FIG. 4, the edge band transmission mechanism 50 further comprises a motor 66 mounted at a bottom side of the platform 10, comprising a gearbox 661 and a power output shaft 662 coupled to the gearbox 661. The power output shaft 662 is coaxially connected to the transmission shaft 54 so that when the motor 66 is activated to rotate the power output shaft 662, the motor 66 can drive the edge band transferring shaft 52 to rotate, causing the chain 64 to synchronously rotate the glue-applying shaft 31.

Referring to FIG. 3 again, the cutting tool 70 is movably mounted at the platform 10 and disposed at a left side relative to the edge band transmission mechanism 50. The cutting tool 70 is connected to a second pneumatic cylinder 71, and driven by the second pneumatic cylinder 71 to move toward or away from the feeding mechanism 20. When the cutting tool 70 is moved toward the feeding mechanism 20, the cutting tool 70 is capable of cutting off the edge band B.

Figure 6:
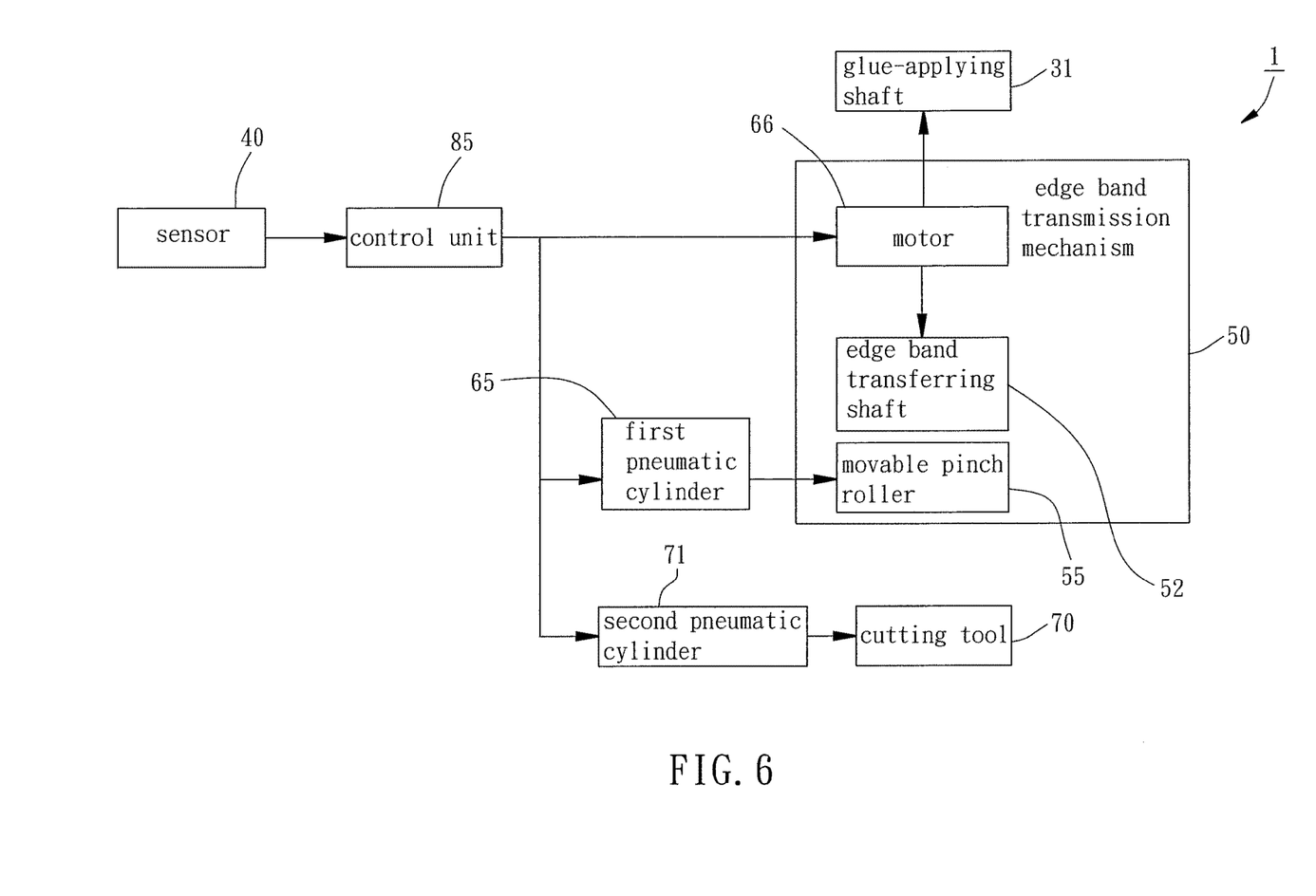
FIG. 6 is a system block diagram of the edge banding machine in accordance with the present invention.

Referring to FIG. 6, the control unit 85 in the present preferred embodiment is a PLC (Programmable Logic Controller) adapted for receiving a sensing signal from the sensor 40 and driving the motor 66, the first pneumatic cylinder 65 and the second pneumatic cylinder 71 according to the received sensing signal, so as to further drive the edge band transferring shaft 52 and the glue-applying shaft 31 to rotate and drive the movable pinch roller 55 and the cutting tool 70 to move.

The edge banding machine 1 further comprises a fixed pressure roller 80 rotatably mounted at the platform 10 at a left side relative to the cutting tool 70. The fixed pressure roller 80 is adapted for giving a pressure to the glue-disposed workpiece S and the glue-coated edge band B, causing the glue-coated edge band B to be positively adhered to the side surface P of the workpiece S.

Figure 5A:
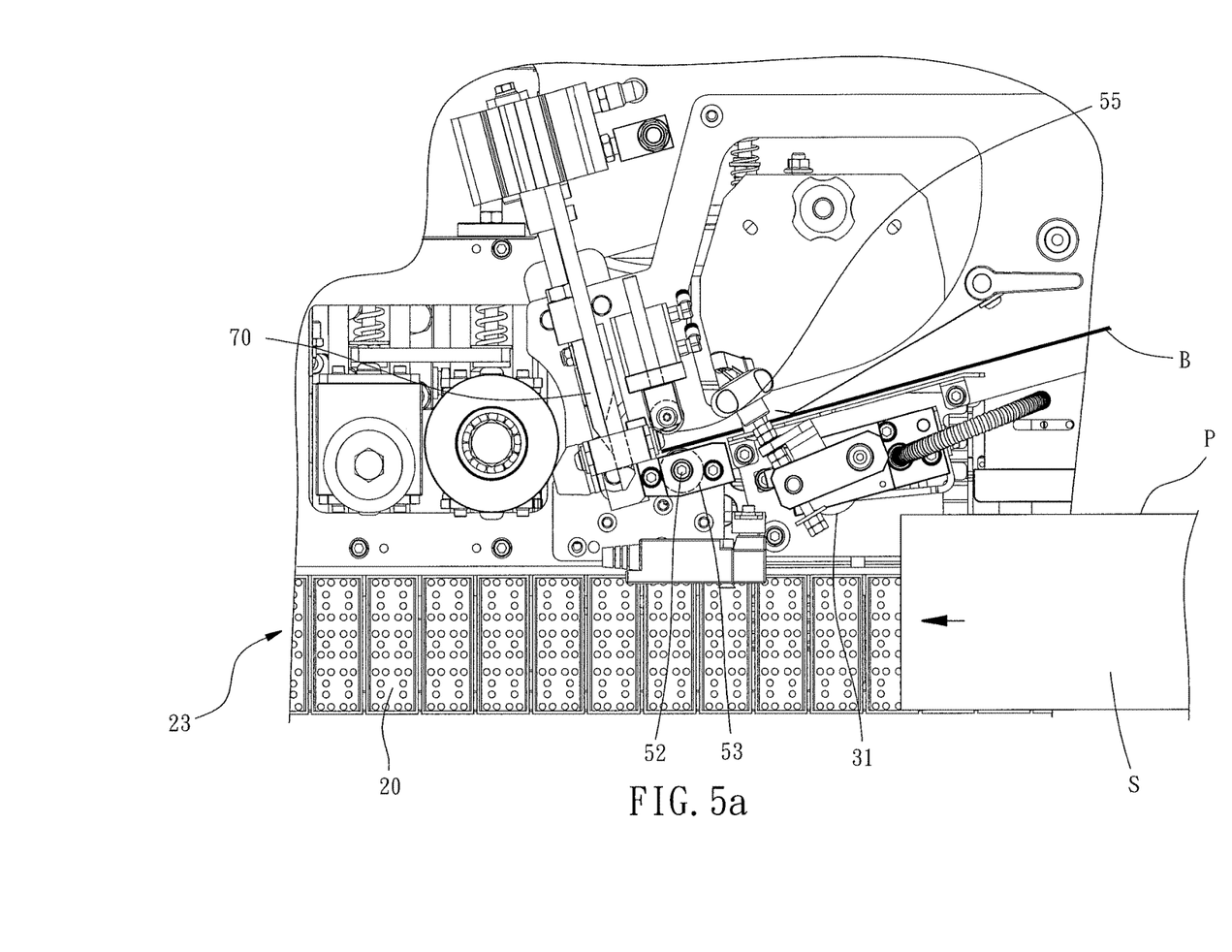
FIGS. 5a~5d are schematic drawings illustrating the operation of the edge banding machine in accordance with the present embodiment of the present invention.

The operation of the edge banding machine 1 is described hereinafter with reference to FIGS. 5a-5d. After the workpiece S is positioned in the feeding mechanism 20, the workpiece S is then transferred by the feeding mechanism 20 toward the discharge end 23 at a predetermined speed. At this time, the movable pinch roller 55 is disposed in the remote position, the cutting tool 70 is disposed remote from the feeding mechanism 20, the control unit drives the motor 66 to rotate the edge band transferring shaft 52 and the glue-applying shaft 31 synchronously, causing the glue-applying shaft 31 to suck up the hot melt glue, as illustrated in FIG. 5a.

Figure 5B:
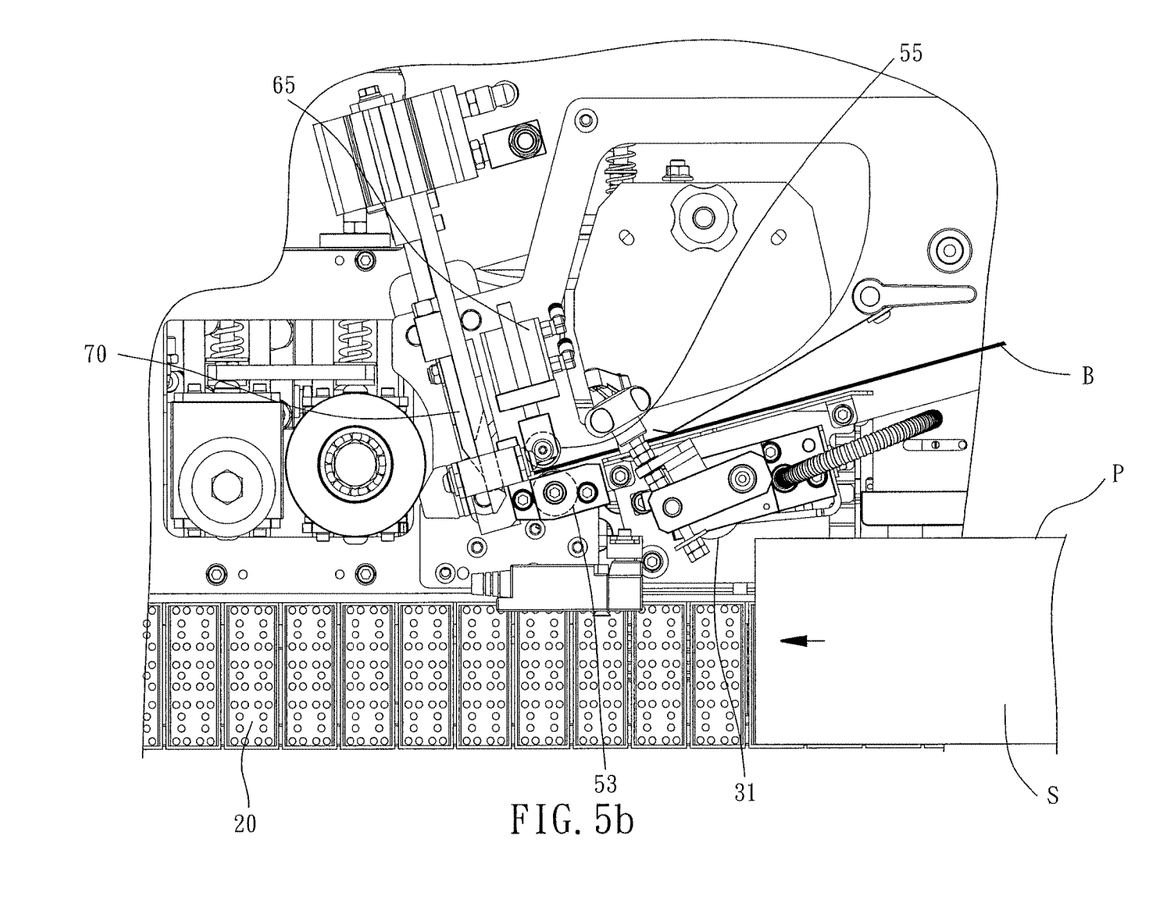
Figure 5C:
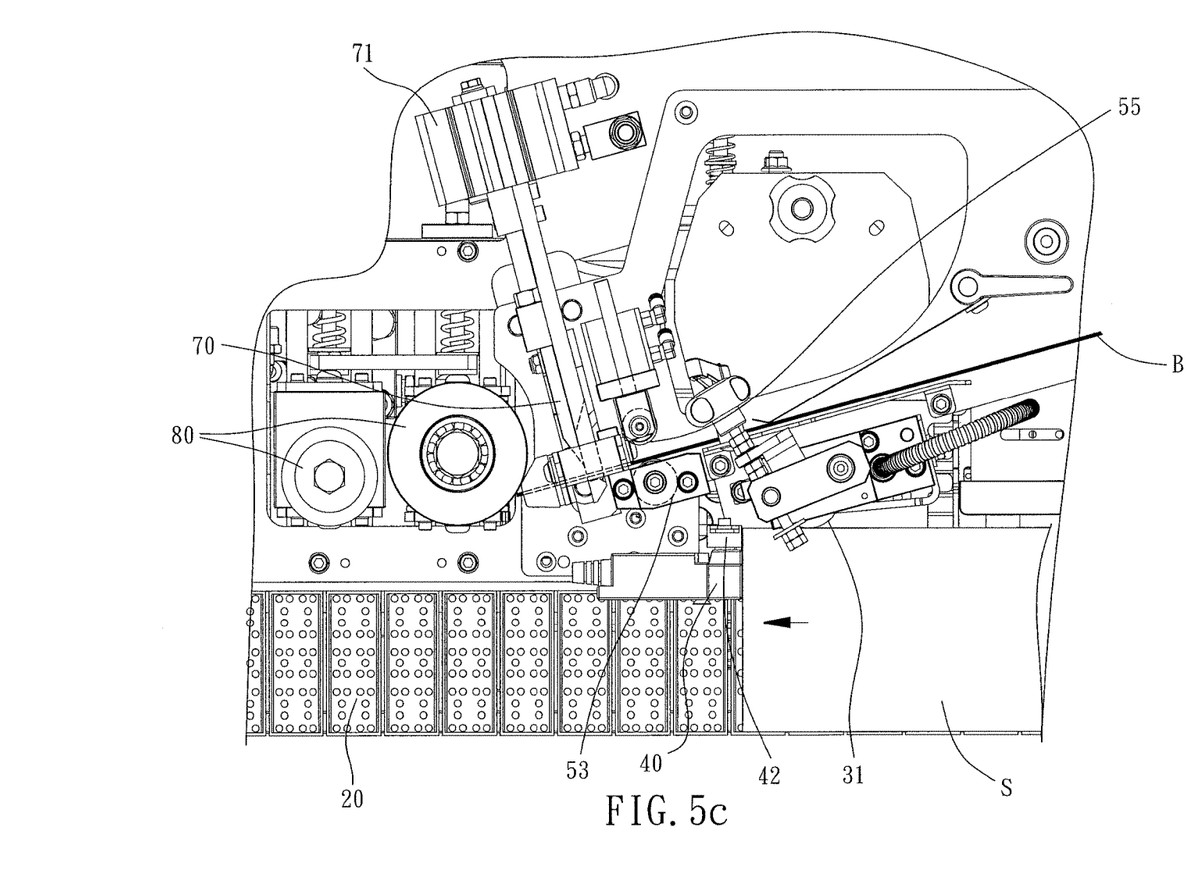
Figure 5D:
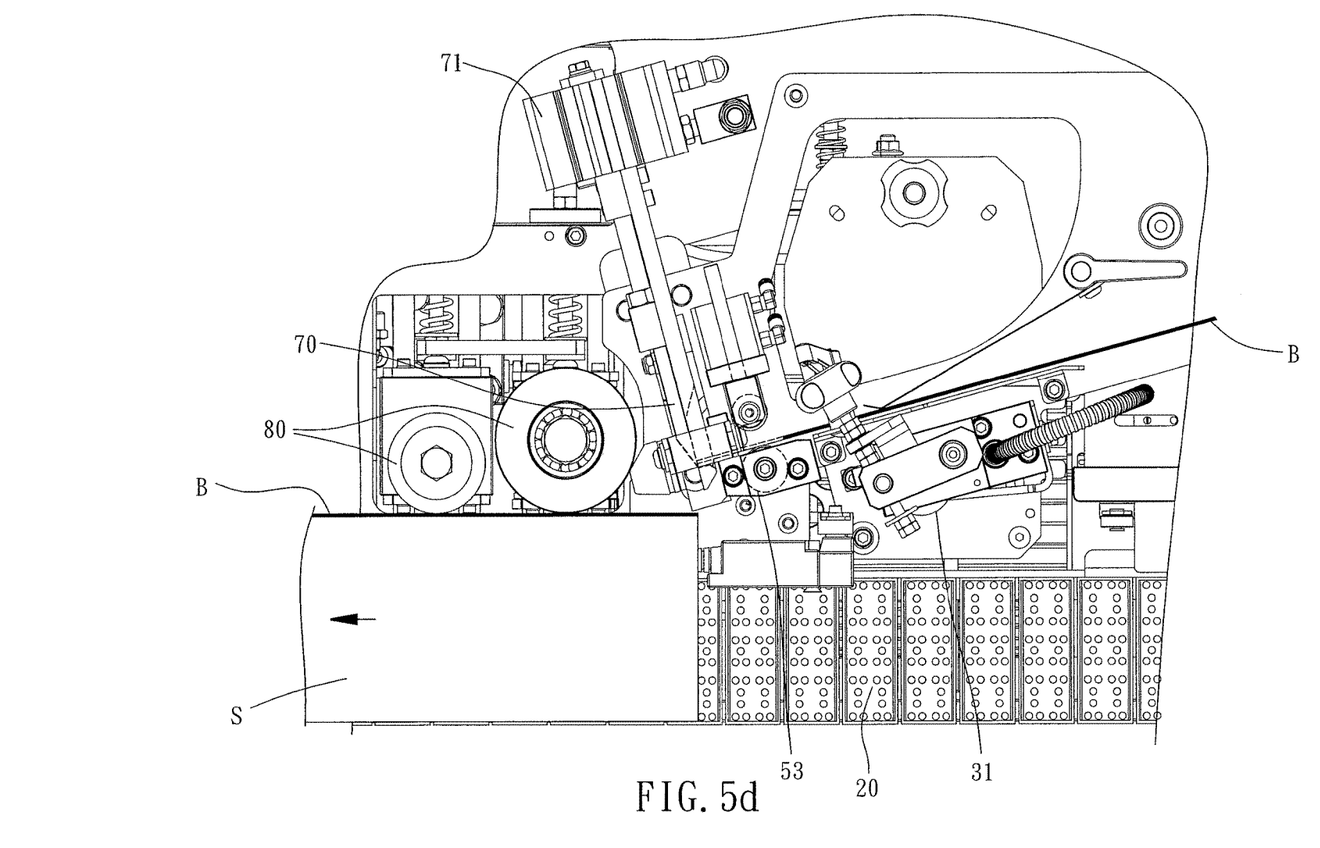

Thereafter, as illustrated in FIG. 5b, the control unit 85 controls the first pneumatic cylinder 65 to move the movable pinch roller 55 to the proximal position, forcing the edge band B into contact with the edge band transferring roller 53 and the movable pinch roller 55 and enabling the edge band transferring roller 53 to carry the edge band B forward for a predetermined distance. Thereafter, the control unit 85 controls the movable pinch roller 55 to move back to the previous remote position, and the edge band B is paused and waiting for bonding with the workpiece S.

At this time, the workpiece S is moved to the glue-applying shaft 31 so that the respective side surface P of the workpiece S is disposed with the hot melt glue. When the workpiece S begins to contact the rotating shaft 42 of the sensor 40 and to force the rotating shaft 42 to rotate (see FIG. 5c), the control unit 85 will wait for a predetermined period of time. Thereafter, the glue-disposed workpiece S is continuously moved forward into contact with the edge band B, and thus, the edge band B is bonded with the glue-coated workpiece S positively by the fixed pressure roller 80 (see FIG. 5d). After the predetermined period of time is up, the control unit 85 controls the second pneumatic cylinder 71 to move the cutting tool 70, cutting off the part of the edge band B that is bonded with the workpiece S, and thus, the edge band B banding operation is done.

Since the edge band transferring shaft 52 and glue-applying shaft 31 of the edge banding machine 1 is connected by the chain 64 for allowing the edge band transferring shaft 52 and the glue-applying shaft 31 to be synchronously rotated, the speed of the edge band transferring shaft 52 and the speed of the glue-applying shaft 31 can be maintained consistent in a long time operation of the edge banding machine 1, eliminating the problem that the technical staff needs to spend extra time and money to tune the speed.

Further, the aforesaid predetermined period of time is determined according to the size of the workpiece S to be processed, and the predetermined speed is constant. Thus, the user can set the predetermined period of time according to the side length of the workpiece S, enabling the length obtained by multiplying the predetermined period of time by the predetermined speed to be slightly greater than the side length of the workpiece S. In this manner, the length of the cut-off piece of the edge band B can be accurately controlled, so that the aforesaid predetermined speed can be maintained constant without being affected by the surface smoothness of the workpiece S. Further, when compared with the conventional banding machine, the edge banding machine 1 of the present invention does not use any workpiece driven roller to transfer the roller; after a long use of the edge banding machine 1, cut-off pieces of the edge band B can still be maintained in a constant length, so that the problem of length inaccuracy can be effectively avoided. Therefore, the edge banding machine 1 of the present invention can effectively reduce the machining error and save the material consumption of the edge band B.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An edge banding machine for affixing an edge band to a workpiece, comprising:
   a platform;
   a glue applicator mounted at said platform, said glue applicator comprising a glue-applying shaft; and
   an edge band transmission mechanism mounted at said platform adjacent to said glue applicator, said edge band transmission mechanism comprising an edge band transferring shaft disposed in parallel to said glue-applying shaft, a chain coupled between said edge band transferring shaft and said glue-applying shaft for enabling said edge band transferring shaft and said glue-applying shaft to be synchronously rotated, and a motor connected with one of said edge band transferring shaft and said glue-applying shaft for driving said edge band transferring shaft to rotate.

2. The edge banding machine as claimed in claim 1, wherein said edge band transmission mechanism further comprises a transmission shaft disposed in parallel to said edge band transferring shaft; said edge band transferring shaft is mounted with a first gear; said transmission shaft is mounted with a second gear which is meshed with said first gear; said edge band transferring shaft is coupled to said glue-applying shaft through said transmission shaft and said chain.

3. The edge banding machine as claimed in claim 2, wherein said transmission shaft is mounted with a third gear; said glue-applying shaft is mounted with a fourth gear; said chain is coupled between said third gear and said fourth gear.

4. The edge banding machine as claimed in claim 2, wherein said motor comprises a power output shaft coaxially connected with said transmission shaft.

5. The edge banding machine as claimed in claim 1, wherein said edge band transmission mechanism further comprises a rack, an edge band transferring roller and a movable pinch roller; said edge band transferring shaft is mounted in said rack and connected to said edge band transferring roller; said edge band transferring roller having at least a part thereof exposed an outside of said rack and is adapted for transferring said edge band forward; said movable pinch roller is movable between a proximal position in proximity to said edge band transferring roller and a remote position remote from said edge transferring roller; said edge banding machine further comprises a sensor adapted for detecting the position of said workpiece and generating a corresponding sensing signal, and a control unit adapted for receiving said sensing signal and controlling said movable pinch roller to move according to the received said sensing signal.

6. An edge banding machine for affixing an edge band to a workpiece, comprising:
a platform;
a feeding mechanism mounted at said platform and adapted for feeding said workpiece;
a glue applicator mounted at said platform, said glue applicator comprising a glue-applying shaft;
a sensor mounted at said platform and adapted for detecting said workpiece and generating a corresponding sensing signal;
an edge band transmission mechanism mounted at said platform adjacent to said glue applicator, said edge band transmission mechanism comprising an edge band transferring shaft disposed in parallel to said glue-applying shaft, a chain coupled between said edge band transferring shaft and said glue-applying shaft for enabling said edge band transferring shaft and said glue-applying shaft to be synchronously rotated, and a motor connected with said edge band transferring shaft, said motor synchronously driving said edge band transferring shaft and said glue-applying shaft to rotate through said chain;
a cutting tool movably mounted at said platform adjacent to said edge band transmission mechanism; and
a control unit adapted for receiving said sensing signal and controlling said motor to drive said cutting tool to cut off said edge band according to said sensing signal.

7. The edge banding machine as claimed in claim 6, wherein said edge band transmission mechanism further comprises a transmission shaft disposed in parallel to said edge band transferring shaft; said edge band transferring shaft is mounted with a first gear, said transmission shaft is mounted with a second gear which is meshed with said first gear; said edge band transferring shaft is coupled to said glue-applying shaft through said transmission shaft and said chain.

8. The edge banding machine as claimed in claim 7, wherein said transmission shaft is further mounted with a third gear below said second gear; said glue-applying shaft has a fourth gear mounted at a bottom end thereof; said chain is coupled between said third gear and said fourth gear.

9. The edge banding machine as claimed in claim 7, wherein said motor comprises a power output shaft coaxially connected to said transmission shaft.

10. The edge banding machine as claimed in claim 6, wherein said edge band transmission mechanism further comprises a rack, an edge band transferring roller and a movable pinch roller; said edge band transferring shaft is mounted in said rack and connected to said edge band transferring roller; said edge band transferring roller has at least a part thereof exposed outside of said rack and is adapted for transferring said edge band forward; said movable pinch roller is controllable by said control unit to move between a proximal position in proximity to said edge band transferring roller and a remote position remote from said edge transferring roller; said control unit controls said movable pinch roller to move according to said sensing signal.

* * * * *